United States Patent [19]
Bourgeois et al.

[11] Patent Number: 5,272,430
[45] Date of Patent: Dec. 21, 1993

[54] SYSTEM FOR CONTROLLING AN INVERTER THROUGH PULSE WIDTH MODULATION

[75] Inventors: Jean-Marie Bourgeois, La Bedoule; Bruno Maurice, Eguilles; Bernard Saby, Aix En Provence, all of France

[73] Assignee: SGS-Thomson Microelectronics S.A., Gentilly, France

[21] Appl. No.: 853,403

[22] Filed: Mar. 18, 1992

[30] Foreign Application Priority Data

Mar. 18, 1991 [FR] France .................... 91 03463

[51] Int. Cl.⁵ ............................ H02P 7/00
[52] U.S. Cl. .................... 318/812; 318/811; 363/41
[58] Field of Search ............... 318/798–812, 318/139, 254, 439, 599, 696, 688; 363/17, 41, 98, 132, 136, 67–72, 37; 388/825, 828, 829, 831, 842, 853, 854, 904, 907.5

[56] References Cited

U.S. PATENT DOCUMENTS

| | | | |
|---|---|---|---|
| 4,447,786 | 5/1984 | Saar et al. | 318/811 |
| 4,458,194 | 7/1984 | Geppert | 318/811 |
| 4,491,768 | 1/1985 | Slicker | 318/811 |
| 4,656,572 | 4/1987 | Caputo et al. | 318/802 X |
| 4,843,297 | 6/1989 | Landino et al. | 318/811 |
| 4,849,871 | 7/1989 | Wallingford | 318/811 X |
| 4,891,764 | 1/1990 | McIntosh | 388/854 X |
| 4,961,038 | 10/1990 | MacMinn | 318/696 |

FOREIGN PATENT DOCUMENTS

0248449A1 12/1987 European Pat. Off. .

OTHER PUBLICATIONS

"An On-Line PC-Based Converter PWM Modulator", Vincenti et al., 1988 IEEE IAS Annual Meeting Conf. Rec. Oct. 2, 1988, pp. 895–902.

*Primary Examiner*—Jonathan Wysocki
*Attorney, Agent, or Firm*—Lowe, Price, Leblanc & Becker

[57] ABSTRACT

A system provides parallel sequences of control signals, each control signal having a determined duration (T), constant within a sequence, and a predetermined duty cycle, specific to the control signal. A microcontroller (20) includes a central processing unit (21) and a non-volatile memory (23) arranged in blocks (Bij) of lines and columns. Each line corresponds to a word containing at least as many bits as parallel sequences. A Direct Memory Access (DMA) controller (24) and an associated counter (25) sequentially address each word of a block at a fixed frequency and supply bits of this word in parallel to produce the parallel control signals.

20 Claims, 8 Drawing Sheets

SYSTEM FOR CONTROLLING AN INVERTER THROUGH PULSE WIDTH MODULATION

BACKGROUND OF THE INVENTION

1. Technical Field

The present invention relates to the supply of control voltages for an inverter. For example, the inverter is designed to feed an induction motor at adjustable speed and torque or to generate output sine wave voltages of an uninterruptible power supply. More generally, the invention supplies parallel sequences of control signals from a digital microcontroller.

2. Background Art

FIG. 1 shows the conventional diagram of a three-leg inverter controlled by pulse width modulation (PWM) to supply an asynchronous three-phase motor M. The motor M comprises three inductors L1, L2, L3. In order to run the motor, it is necessary to apply to the inductors sine wave voltages U, V and W, 120° shifted with respect to the other, as shown in FIG. 2. Voltages U, V, W are provided by an inverter comprising six switches T1-T6, for example transistors. Transistors T1-T2, T3-T4, T5-T6 are connected in series between the positive and negative (for example the ground) supply terminals. In FIG. 1, each switch T1-T6 comprises a power switch associated to an anti-parallel diode D1-D6. The control electrodes of two switches in series are oppositely controlled. Thus, it is possible, by properly controlling the control terminals G1-G6 of switches T1-T6 to provide at the junctions U, V and W of switches T1-T2, T3-T4, T5-T6 stage voltages approximating sine waves. More particularly, by varying the duty cycles of switches T1 and T2, (for example by successive steps ranging from 0 to 100% or from 40 to 60%), the average voltage at junction U is made to vary by successive steps to produce sine waves, the amplitude of which is controlled. The period, NT, of the sine waves will be determined by the time period T of each step and the number of steps N. For example, the number N will be chosen equal to 24.

FIG. 3 shows exemplary signals applied to the control terminals G1-G6 of transistors T1-T6 during the time period T of a step. In this example, the duty cycle of signal G1 is 90%, that of signal G3 is 50% and that of signal G5 is 10%. The duty cycles of signals G2, G4, G6 are complementary. During the next step, the time period of these duty cycles is changed, and so forth until the complete period (NT) has elapsed.

The aim of the invention is to provide a method for supplying these sequences of control signals. This problem is for example dealt with in the article by Bellini et al. published in "International Conference on Evolution and Modern Aspects of Induction Machines—Proceedings", Jul. 8-11, 1986, pages 194-202. As indicated in this article, analog and digital techniques have been devised to supply these signals.

A conventional digital system for supplying these signals is shown in FIG. 4. The system mainly uses a microcontroller (MCU) 10 which, for each step, provides the values of the duty cycles of the various bridge legs of FIG. 1. For each step, the MCU provides three digital values and eventually their complements. The microcontroller is followed by a specific interface circuit (ASIC) 11 especially designed to rapidly calculate and supply the control signals shown in FIG. 3 derived from the digital duty cycle values. The six outputs of ASIC 11 are provided to amplification and isolating interface circuits 12 which access the control terminals of the six transistors T1-T6.

This type of arrangement has various drawbacks. First, two integrated circuits are required for providing the control signals, namely MCU 10 and ASIC 11. ASIC 11 is a circuit especially designed for this application and is therefore not manufactured in mass production, which unavoidably entails a relatively high cost. Furthermore, the ASIC 11 is adapted to a specific application; and it is not programmable. The ASIC 11 therefore must be redesigned to change its functions, for example, as will be explained later on, to modify the distribution of the control signals.

SUMMARY OF THE INVENTION

To overcome these drawbacks, the invention provides a single microcontroller directly providing the signals which up to now have been obtained only at the output of a specific interface circuit.

More generally, the invention provides a system and a method for supplying parallel sequences of control signals, each control signal having a predetermined duration within a sequence and a predetermined duty cycle specific to that control signal.

The system comprises a microcontroller incorporating a central processing unit and a non-volatile memory arranged in blocks of lines and columns. Each line of non-volatile memory corresponds to a word containing at least as many bits as parallel sequences. The microcontroller also includes a direct memory access (DMA) controller associated with a counter for sequentially addressing at a fixed frequency each word of a block and supplying in parallel the bits of the addressed word. In each column of a block, the ratio between the number of bits at a first state and the number of bits at a second state corresponds to the duty cycle for a predetermined control signal, and the microcontroller is programmed so as to repeat reading of a block until it reaches the predetermined duration of a control signal before proceeding to the repetitive reading of another block, and so forth.

The method of generating the parallel sequences of control signals includes sequentially addressing, at a fixed frequency, each multi-bit word of data stored in a block of non-volatile memory. Each word contains at least as many bits as there control signals. The bits of the addressed words are supplied in parallel to the terminals of a multi-bit output port to produce the control signals. The addressing and supplying steps are repeated sequentially to access data from another block of the non-volatile memory. Data in the corresponding bit position of all words in each block of non-volatile memory forms columns, and in each column of each block, the ratio between the number of bits at a first state and the number of bits at a second state corresponds to the duty cycle for a predetermined control signal.

According to an application of the invention, the control signals are designed for a multi-leg bridge, each leg comprising two serially controlled switches. The two switches of a leg receive substantially opposite signals. The first switches of each leg receive control signals, the duty cycle of which varies between a maximum and a minimum value, and the signals applied to each leg are phase-shifted. This bridge, for example, is designed to control an asynchronous motor or an uninterruptible power supply.

BRIEF DESCRIPTION OF THE DRAWINGS

The foregoing and other objects, features and advantages of the invention will be apparent from the following detailed description of a preferred embodiment as illustrated in the accompanying FIGURES wherein.

DETAILED DESCRIPTION OF THE INVENTION

Figure 5:
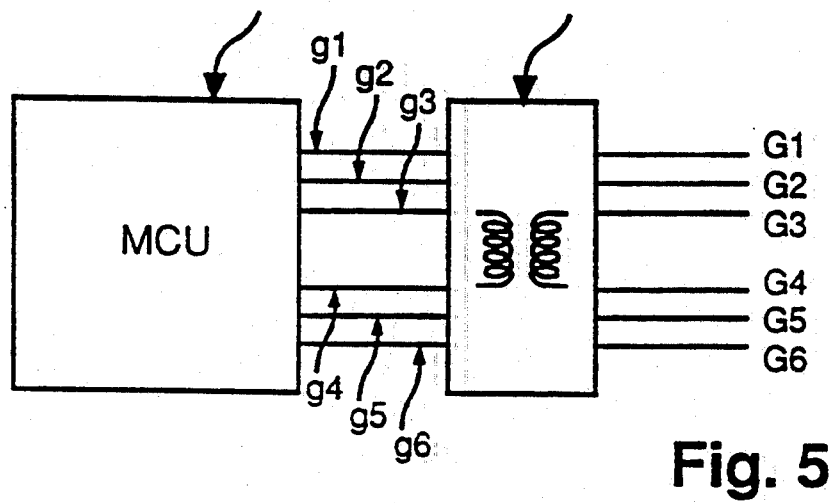
FIG. 5 shows a system for providing control signals according to the present invention.

As shown in FIG. 5, the invention uses a microcontroller (MCU) 20 to directly generate the square wave signals g1-g6, which, after passing through an amplification and isolating interface 12, become gate control signals G1-G6.

One example of the microcontroller is marketed by SGS-Thomson Microelectronics under the reference ST9.

Figure 6:
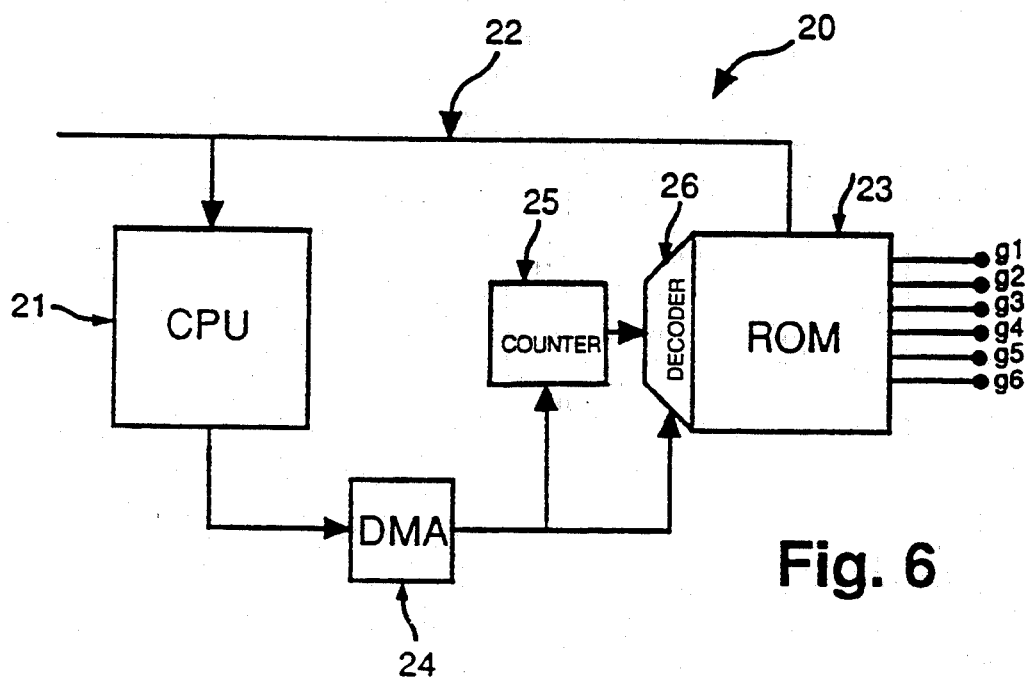
FIG. 6 is a schematical block diagram illustrating the arrangement of the microcontroller used according to the present invention.

As shown in FIG. 6, the microcontroller 20 comprises a central processing unit (CPU) 21 communicating with the various components of the microcontroller 20 via a bus 22. These various components include Read Only Memory (ROM) 23 and other components, not shown, such as a Random Access Memory (RAM), an Electrically Erasable Read Only Memory (EEPROM), and counters. The microcontroller is operated in a Direct Memory Access (DMA) mode by controller 24. This allows controlling a counter 25 and a decoder 26, associated to the ROM 23, for reading the contents of this ROM independently of the operation of the CPU which can continue in relation to the other microcontroller components during reading operations of the ROM. This aspect of the invention will be described later in more detail.

Figure 7:
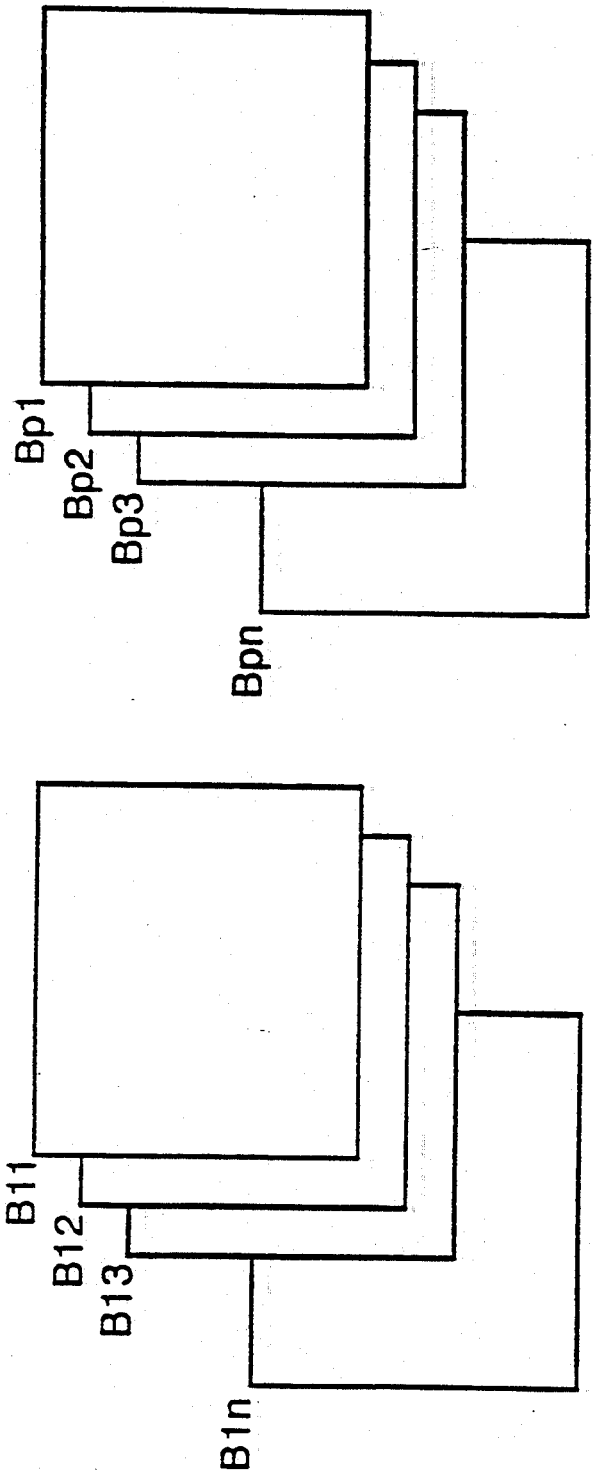
FIG. 7 shows the block arrangement of the memory used in the microprocessor according to the present invention.

FIG. 7 shows the block arrangement of ROM 23. This memory is arranged in p groups of n blocks, referenced Bl1-Bln Bp1-Bpn, respectively. Each group of blocks contains data adapted to ensure the control of an asynchronous motor under predetermined conditions, particularly for a desired control voltage amplitude. Each block within a group of blocks has a configuration corresponding to the control signals to be provided during a predetermined time increment.

The time period T' of a time increment will generally be a submultiple of the time T of a step such as mentioned above. The number of blocks n in a group of blocks is equal to the number of steps N. The same block may be repeated several times during the duration of a single step.

Figure 8:
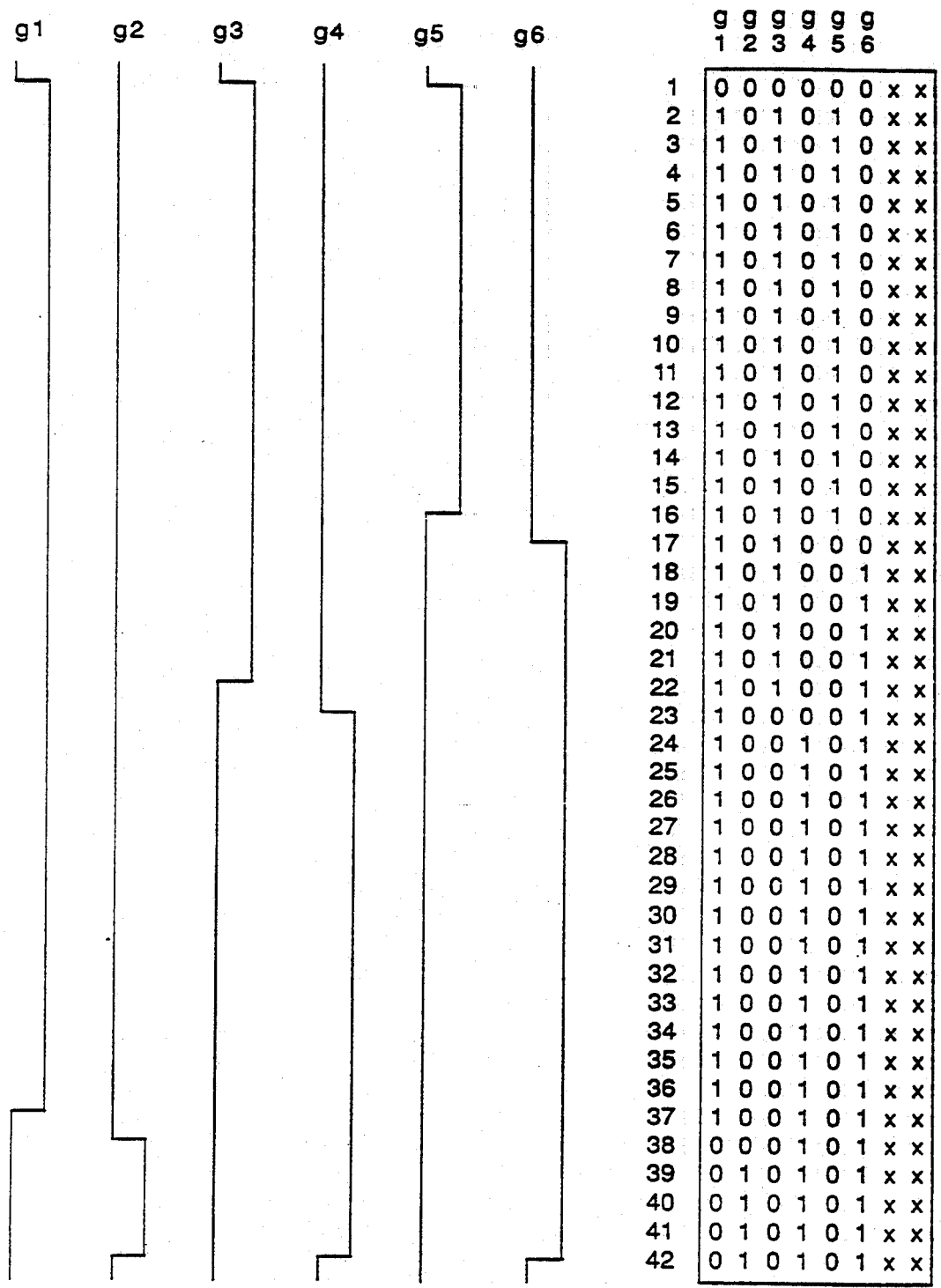
FIG. 8 shows an exemplary content of a memory block according to the present invention and corresponding exemplary control signals.

The content of a specific block is indicated by way of example in FIG. 8. Each block contains words arranged in columns. In the given example, it is desired to provide six control signals. Therefore, each of the first six columns will correspond to a control signal g1 . . . g6. Since memories are usually designed for 8-bit words, x's indicate two additional bits of each word which can be used for providing synchronization signals allowing masking of switching times when the average current in the charge is measured, or for measuring the voltage/current phase-shift in the charge. Thus, each predetermined duration or increment of a control signal contained in a block is in turn quantified in a sequence of elementary values, 42 values in the given example. As seen above, the bits of each word can be sequentially transferred onto an output port of the controller and will therefore directly represent the state of the desired control signal.

FIG. 8 shows on the left, on a vertical time scale, exemplary signals g1-g6 that are desired to be provided by the bits stored in a block Bij. In the given example, during the quantification time 1, all the bits of the first word are null representing a first logic state. During the quantification time 2, it is desired that signals g1, g3 and g5 go high; therefore, bits 1, 3 and 5 each have a value of 1 representing a second logic state. This state is maintained until the quantification time 17 when bit 5 is reset to 0. At time 18, bit 6 is set from 0 to 1. The simultaneous 0-state of bits 5 and 6 during time 17, when signals g5 and g6 are switched, is intended to avoid two control signals in the inverter bridge simultaneously going high. Similarly, reset occurs during quantification time 23 for bits 3 and 4, during the quantification time 38 for bits 1 and 2 and, as seen above, during quantification time 1 for all bits. Thus, signals g1-g6, shown on the left of FIG. 8, are provided on the six least significant bits of the microcontroller output port.

Figure 1:
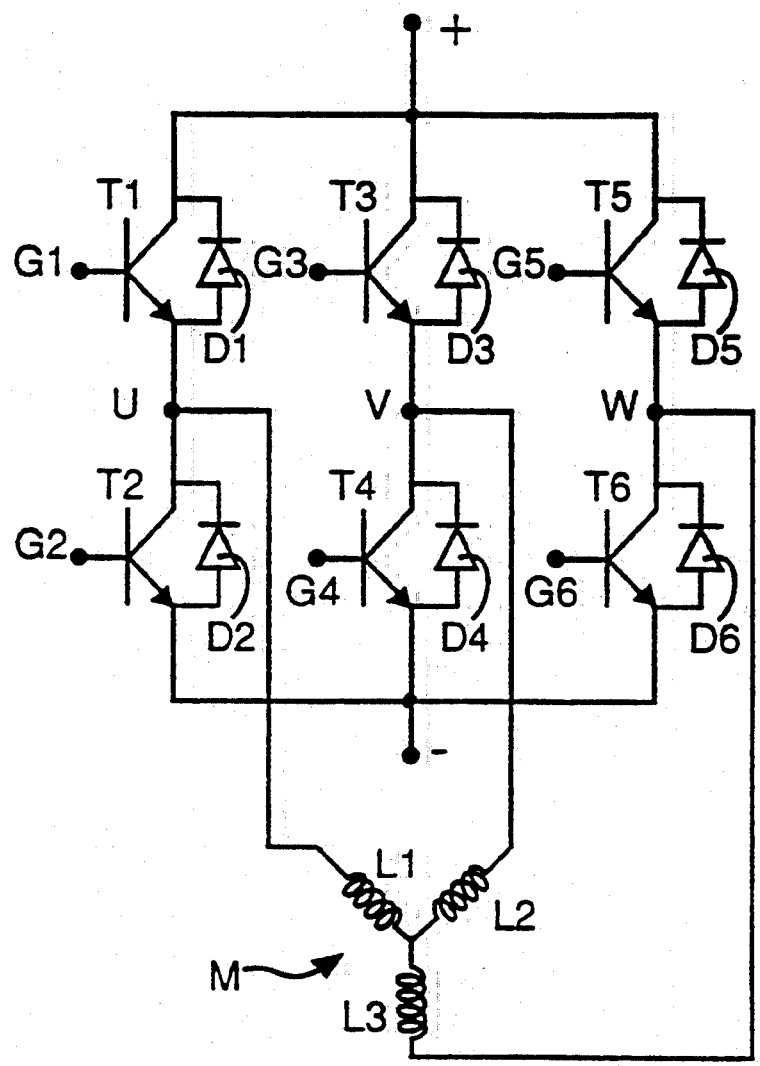
FIG. 1 shows an inverter for the control of a three-phase asynchronous motor according to the prior art.
Figure 2:
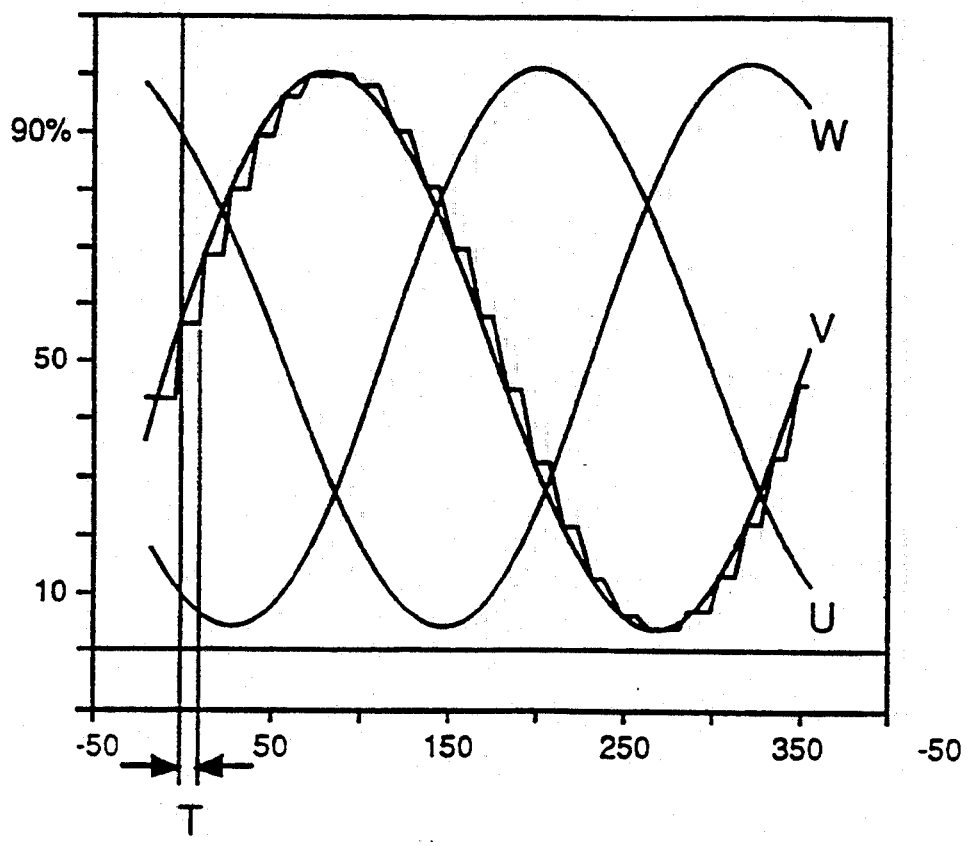
FIG. 2 shows the basic control voltages that have to be applied to the motor windings by the inverter of FIG. 1.
Figure 3:
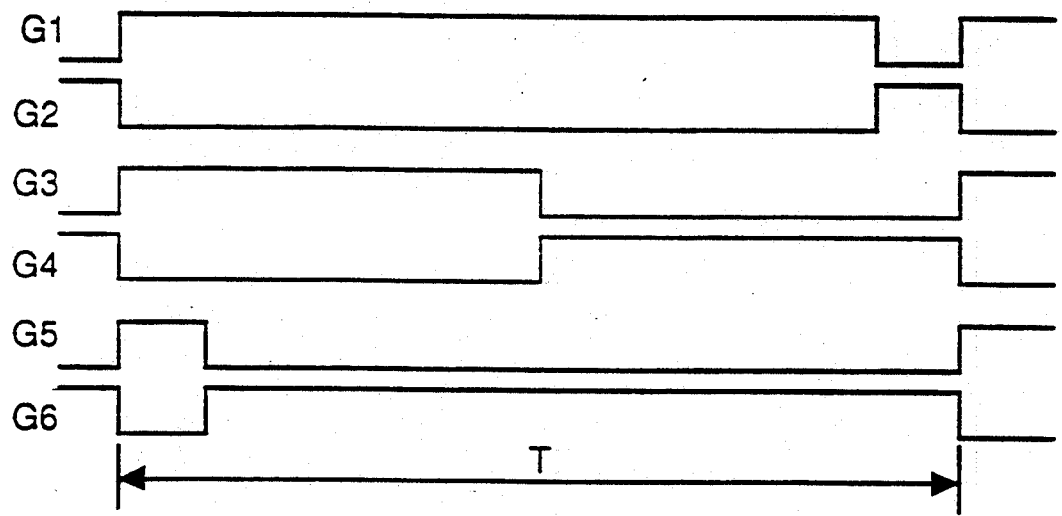
FIG. 3 shows the control signals applied to each of the transistors of the three-phase bridge in the circuit of FIG. 1 during a step.

It is explained above that signals g1-g6 correspond to signals G1-G6 controlling the current inverter switches. In fact, each of signals g1-g6 is provided with a specific periodicity of the microcontroller internal clock controlling counter 25. For example, if the clock period is 5 microseconds, the duration of signals g1-g6 will be 42 times 5 microseconds, that is, about 200 microseconds. Referring to FIG. 2, it should be recalled that the sampling adopted for the sine waves is for example N=24 points (which corresponds to the number n of blocks in a group of blocks). Thus, reading of an entire group of blocks will require a minimum period of 200×24 microseconds, that is, about 5 milliseconds. This corresponds to a rotation frequency of the engine stator field of 200 Hz. To decrease the speed of rotation, the invention repeats each elementary signal, such as signals g1-g6 shown in FIG. 8, a predetermined number of times before processing the next block of a defined group of blocks. For example, if the configuration shown in FIG. 8 is repeated four times, in the case of the above digital values, the speed of the motor will be 3,000 r.p.m. The speed will be 2,000 r.p.m. for six repetitions of each block. This change of the motor speed is provided by programming the microcontroller.

In addition, with the above digital values (42 octets/block and 24 blocks for a group of blocks entirely defining a configuration of the determined control signal), 24×42 bytes, that is about 1,000 bytes of data, by group of blocks will be necessary. Generally, in typical applications, it is not desired to provide more than 3 to 8 voltage values for controlling the motor, which means that only 3 to 8 kilobytes are necessary for the ROM in the CPU to achieve the function aimed at by the invention. These values are quite moderate, especially in the specific case of the above circuit ST9 which comprises either a ROM or an EPROM, having a size of 8, 16 or 32 kilobytes. Therefore, space will be available in this memory for the microcontroller to process other tasks.

Figure 4:
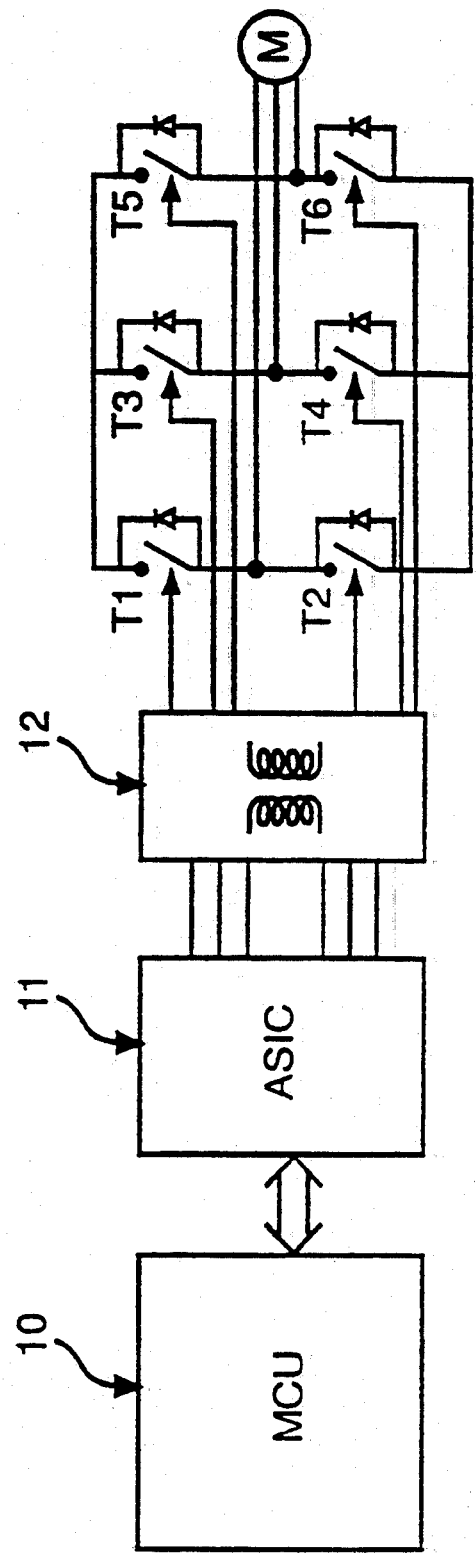
FIG. 4 shows a system for providing control signals according to the prior art.

The invention provides particularly flexible programming of the inverter control signals for an asynchronous motor or for an uninterruptible power supply. According to a specific aspect of the invention, shown in FIG. 9, whereas conventional circuits for generating signals according to the prior art illustrated in FIG. 4, provide control signals g1, g3 and g5 all having rising edges during the same initial time; it is possible with the invention to simply change the presentation of the square waves while maintaining the same duty cycle for each elementary control signal.

Figure 9A:
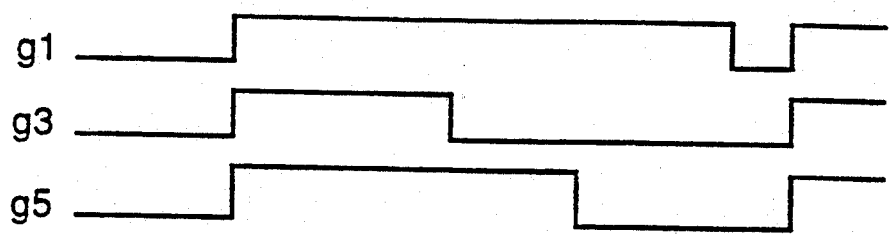
FIGS. 9A-9D show variants of the control signals produced by the invention.
Figure 9B:
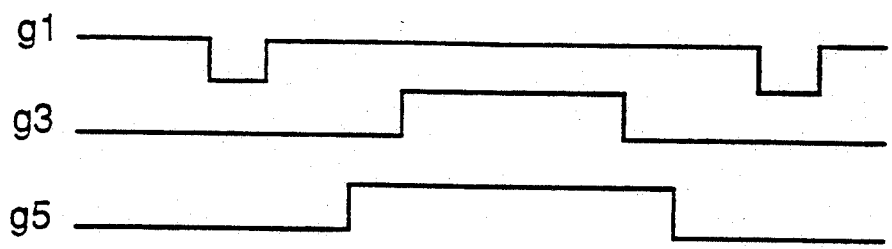
Figure 9C:
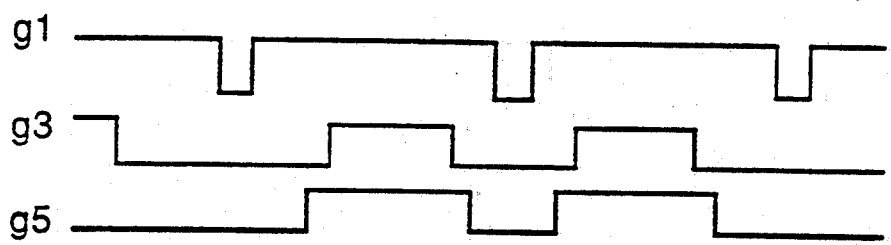

Conventional elementary control signals are shown in FIG. 9A, wherein, recalling the chart of FIG. 8, the ratio of the number of bits in the first state and the number of bits in the second state represents duty cycle of each control signal. The duty cycle of each elementary control signal is able to be changed by the microcontroller 20 which, together with counter 25 and decoder 26 of FIG. 6 controls block reading of ROM 23. A first variant according to the invention is shown in FIG. 9B, wherein the square pulses are centered on the duration of a time increment, which limits the periods when several switches are simultaneously controlled. To produce the signals shown in FIG. 9B, inside each column of a block, the bits at a first state are centered in the column with respect to the bits at a second state. In the case of FIG. 9C, square pulses are centered on two symmetrical axes, which doubles the switching frequency of the power switches. To produce the control signals of FIG. 9C, inside each column of a block, several groups of bits at a first state are interleaved with several groups of bits at the second state, the assembly being arranged symmetrically with respect to the center of the column. The arrangements shown in FIGS. 9B and 9C have practical advantages with regard to elimination of the switching noises of the inverter and therefore noises from the motor (hiss), as well as the reduction of loss in the motor by minimizing the stored reactive energy.

Figure 9D:
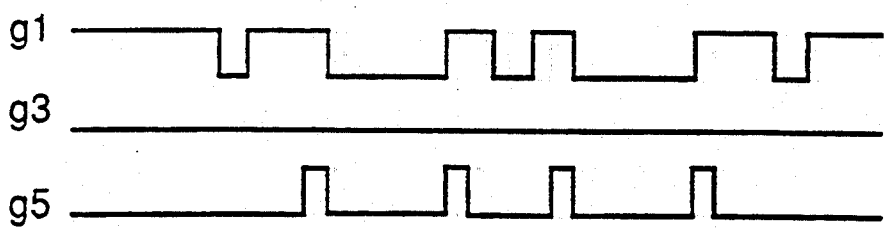

FIG. 9D shows a further variant of the invention wherein, each time that the three upper switches are simultaneously off and therefore when no instantaneous voltage is applied to the motor, it is desirable to set them to the off state and to render their adjacent switch conductive. This decreases losses resulting from switching in the inverter at a determined switching frequency, because one of the legs of the bridge remains static during the scanning period of each block. To produce the control signals of FIG. 9D, inside each block, when all the bits corresponding to the switches on the same side of the various legs are in equal state, they are automatically set to a predetermined state.

In addition, as described above, it is simple according to the invention to provide idle times between switching of two switches of the same current inverter leg, which avoids malfunctions of the latter, whereas, in the prior art, to achieve this function requires a complex control circuit 12.

Further variants will appear to those skilled in the art. It will be noted that it is very simple according to the invention to select and change the shape of the elementary control signals by selecting and modifying the data contents of the above memory blocks.

We claim:

1. A system for providing parallel sequences of a plurality of control signals, each control signal having a predetermined duration, constant within a sequence, and a predetermined duty cycle specific to said control signal, said system comprising: a microcontroller comprising a central processing unit, a non-volatile memory arranged in blocks of lines and columns, each line corresponding to a word containing at least as many bits as there are control signals in said plurality of control signals, and direct memory access (DMA) means associated with a counter for sequentially addressing, at a fixed frequency, each word of a block and for supplying bits of the addressed words in parallel, wherein:

in each column of a block, the ratio between the number of bits at a first state and the number of bits at a second state corresponds to said duty cycle for a predetermined control signal; and the DMA means includes means to sequentially read all the words of a block and to repeat these entire block readings a predetermined number of times necessary to complete the duration of said control signal before proceeding with the repetitive readings of another entire block.

2. A system according to claim 1, wherein the control signals are intended for a multi-leg bridge, each leg comprising two serially controlled switches, the two switches of a leg receiving substantially complementary ones of said control signals, the first switches of each leg receiving one of said control signals the duty cycle of which varies between a maximum and a minimum value, the signals applied to each leg being phase-shifted.

3. A system according to claim 2, wherein, inside each column of a block, the bits at a first state are centered in the column with respect to the bits at a second state.

4. A system according to claim 2, wherein, inside each column of a block, several groups of bits at a first state are interleaved with several groups of bits at the second state, the assembly being arranged symmetrically with respect to the center of the column.

5. A system according to claim 2, wherein, inside each block, when all the bits corresponding to the switches on the same side of the various legs are in equal state, they are automatically set to a predetermined state.

6. A system according to claim 2, wherein the changes of state of the bits in one column and of the bits of another column corresponding to the complementary control signal are separated by a reset interval.

7. A system according to claim 2, wherein each word comprises additional bits forming additional columns used as synchronization bits.

8. A method of generating in parallel sequences of a plurality of control signals each having a predetermined duration, constant within a sequence, and a predetermined duty cycle specific to said control signal, said method comprising the steps of:

(1) sequentially addressing, at a fixed frequency, each multi-bit word of data stored in a block of non-volatile memory, each word containing at least as many bits as the number of control signals in said plurality of control signals; and (2) supplying the bits of the addressed words in parallel to the terminals of a multi-bit output port to produce said control signals;

(3) repeating steps (1) and (2) in succession a prescribed number of times for said predetermined duration of a control signal, and then:

(4) sequentially performing steps (1) through (3) to address and supply data from another block of non-volatile memory, wherein data in the corresponding bit position of all words in each block of non-volatile memory forms columns, and in each column of each block, the ratio between the number of bits at a first state and the number of bits at a second state corresponds to said duty cycle for a predetermined control signal.

9. A method according to claim 8, further comprising applying the control signals from the multi-bit output port to a multi-leg bridge, each leg comprising two serially controlled switches, the two switches of a leg receiving substantially complementary ones of said control signals, the first switches of each leg receiving one of said control signals the duty cycle of which varies between a maximum and a minimum value, the signals applied to each leg being phase-shifted.

10. A method according to claim 9, wherein, inside each column of a block, the bits at a first state are centered in the column with respect to the bits at a second state.

11. A method according to claim 9, wherein, inside each column of a block, several groups of bits at a first state are interleaved with several groups of bits at the second state, the assembly being arranged symmetrically with respect to the center of the column.

12. A method according to claim 9, wherein, inside each block, when all the bits corresponding to the switches on the same side of the various legs are in equal state, they are automatically set to a predetermined state.

13. A method according to claim 9, wherein the changes of state of the bits in one column and of the bits of another column corresponding to the complementary control signal are separated by a reset interval.

14. A method according to claim 8, wherein each word comprises additional bits forming additional columns used as synchronization bits.

15. A method according to claim 8, further comprising programming a microcontroller to perform method steps (1)–(4).

16. A method according to claim 8, further comprising programming the data stored in the blocks of the non-volatile memory so that performance of method steps (1)–(4) will produce said parallel sequences of a plurality of control signals.

17. An apparatus for providing parallel sequences of a plurality of control signals, each control signal having a predetermined duration, constant within a sequence, and a predetermined duty cycle specific to said control signal, said system comprising:

a non-volatile memory arranged in blocks of lines and columns, each line corresponding to a word containing at least as many bits at the number of control signals in said plurality of control signals, wherein in each column of a block, the ratio between the number of bits at a first state and the number of bits at a second state corresponds to said duty cycle for a predetermined control signal; and direct memory access means for sequentially addressing, at a fixed frequency, each word in each of a series said block and for supplying bits of the addressed words in parallel, said direct memory access means being controlled to sequentially read all the words of a block and to repeat these entire block readings a predetermined number of times for said predetermined duration of said control signal before proceeding with the repetitive readings of another entire block.

18. An apparatus according to claim 17, further comprising a multi-leg bridge, each leg comprising two serially controlled switches, the two switches of a leg receiving substantially complementary ones of said control signals, the first switches of each leg receiving one of said control signals the duty cycle of which varies between a maximum and a minimum value, the signals applied to each leg being phase-shifted.

19. An apparatus according to claim 17, further comprising a central processing unit for controlling the sequential operations of said direct memory_access means.

20. An apparatus according to claim 19, wherein said central processing unit is programmed to control the direct data access means to repeat the addressing of the words of a block until expiration of said predetermined duration of a control signal before processing the repetitive reading of another block.

* * * * *